(12) United States Patent
Gage et al.

(10) Patent No.: US 10,359,051 B2
(45) Date of Patent: Jul. 23, 2019

(54) IMPELLER SHROUD SUPPORTS HAVING MID-IMPELLER BLEED FLOW PASSAGES AND GAS TURBINE ENGINES INCLUDING THE SAME

(71) Applicant: HONEYWELL INTERNATIONAL INC., Morris Plains, NJ (US)

(72) Inventors: Raymond Gage, Phoenix, AZ (US); Bruce David Reynolds, Chandler, AZ (US); Jeffrey D. Harrison, Mesa, AZ (US); Michael Todd Barton, Phoenix, AZ (US); Mahmoud Mansour, Phoenix, AZ (US); Kent L. Kime, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 718 days.

(21) Appl. No.: 15/006,551

(22) Filed: Jan. 26, 2016

(65) Prior Publication Data
US 2017/0211586 A1    Jul. 27, 2017

(51) Int. Cl.
*F01D 13/02* (2006.01)
*F04D 29/42* (2006.01)
(Continued)

(52) U.S. Cl.
CPC ............ *F04D 29/4206* (2013.01); *F02C 3/08* (2013.01); *F02C 6/08* (2013.01); *F04D 29/284* (2013.01);
(Continued)

(58) Field of Classification Search
None
See application file for complete search history.

(56) References Cited

U.S. PATENT DOCUMENTS

| 3,640,468 A | 2/1972 | Searle et al. |
| 4,183,478 A | 1/1980 | Rudolph |

(Continued)

FOREIGN PATENT DOCUMENTS

| EP | 2055961 A1 | 5/2009 |
| EP | 2447504 A2 | 5/2012 |

(Continued)

OTHER PUBLICATIONS

Extended EP Search Report for Application No. 16197627.9-1607 dated Jun. 13, 2017.

(Continued)

*Primary Examiner* — Woody A Lee, Jr.
*Assistant Examiner* — Jason A Fountain
(74) *Attorney, Agent, or Firm* — Lorenz & Kopf, LLP

(57) ABSTRACT

Embodiments of an impeller shroud support for disposition around an impeller are provided, as are embodiments of gas turbine engine including impeller shroud supports. In one embodiment, the impeller shroud support includes a shroud body, a support arm joined to and extending around the shroud body, and a plurality of Mid-Impeller Bleed (MIB) flow passages. Each MIB flow passage includes, in turn, an inlet formed in the shroud body and configured to receive bleed air extracted from the impeller, a throat portion, an outlet formed in the support arm and through which the bleed air is discharged, and a curved intermediate section between the inlet and the outlet. During usage of the impeller shroud support, the curved intermediate section turns the bleed air flowing through the MIB passage in a radially outward direction prior to discharge from the outlet of the MIB flow passage.

20 Claims, 6 Drawing Sheets

(51) Int. Cl.
  *F04D 29/28* (2006.01)
  *F04D 29/58* (2006.01)
  *F02C 3/08* (2006.01)
  *F02C 6/08* (2006.01)
  *F04D 29/44* (2006.01)

(52) U.S. Cl.
  CPC ......... *F04D 29/444* (2013.01); *F04D 29/582* (2013.01); *F05D 2220/32* (2013.01); *F05D 2240/128* (2013.01); *F05D 2240/30* (2013.01); *F05D 2260/20* (2013.01)

(56) References Cited

U.S. PATENT DOCUMENTS

| | | |
|---|---|---|
| 4,248,566 A | 2/1981 | Chapman et al. |
| 4,790,495 A | 12/1988 | Greathouse et al. |
| 5,224,819 A | 7/1993 | Kemon et al. |
| 5,228,641 A | 7/1993 | Remlaoui |
| 5,236,301 A * | 8/1993 | Palmer ............... F04D 27/0238 415/116 |
| 5,671,598 A | 9/1997 | Standish |
| 6,000,216 A | 12/1999 | Vauchel |
| 6,151,885 A | 11/2000 | Metezeau et al. |
| 6,585,482 B1 | 7/2003 | Liotta et al. |
| 6,663,346 B2 | 12/2003 | Munsell et al. |
| 8,051,639 B2 | 8/2011 | Lair |
| 8,015,797 B2 | 9/2011 | Lair |
| 8,075,247 B2 | 12/2011 | Romani et al. |
| 8,147,178 B2 | 4/2012 | Ottaviano et al. |
| 8,490,408 B2 | 7/2013 | Nichols et al. |
| 8,920,128 B2 | 12/2014 | Matwey et al. |
| 8,935,926 B2 * | 1/2015 | Wagner ............... F02C 6/08 415/104 |
| 2012/0102969 A1 * | 5/2012 | Wagner ............... F02C 6/08 60/785 |
| 2013/0051974 A1 * | 2/2013 | Poon ................. F04D 29/4206 415/1 |
| 2014/0030057 A1 | 1/2014 | Gormley |
| 2014/0271108 A1 | 9/2014 | Duong et al. |
| 2015/0291289 A1 | 10/2015 | Chandler et al. |

FOREIGN PATENT DOCUMENTS

| | | |
|---|---|---|
| EP | 2930371 A1 | 10/2015 |
| GB | 2407142 A | 4/2005 |
| JP | 03260336 A * | 11/1991 |
| WO | 2015081041 A1 | 6/2015 |

OTHER PUBLICATIONS

European Patent and Trademark Office, Examination Report for Application No. 16197627.9 dated Mar. 13, 2019.

* cited by examiner

IMPELLER SHROUD SUPPORTS HAVING MID-IMPELLER BLEED FLOW PASSAGES AND GAS TURBINE ENGINES INCLUDING THE SAME

TECHNICAL FIELD

The present invention relates generally to gas turbine engines and, more particularly, to impeller shroud supports having mid-impeller bleed passages, as well as to gas turbine engines and other turbomachines including such impeller shroud supports.

BACKGROUND

A gas turbine engine often includes a secondary flow system, which extracts bleed air from the engine's core airflow path for turbine cooling, seal buffering, and/or other purposes. By common design, a secondary flow system extracts bleed air from one or more locations along the compressor section of the engine. When utilized to cool a high pressure turbine or another hot section component, the temperature of the bleed air extracted from the compressor section is ideally as low as practical. At the same time, the pressure of the bleed air should be sufficiently high to support an adequate flow rate through the system's cooling circuits. When the airflow is extracted from a compressor section containing a centrifugal compressor or "impeller," these competing criteria are often best satisfied by extracting bleed air from an intermediate or middle section of the impeller. Mid-Impeller Bleed (MIB) systems have thus been developed, which extract bleed air from the impeller mid section during engine operation. In certain cases, the MIB system can include flow passages formed in the impeller itself, which direct bleed air radially inward to cooling circuits extending along the shaft or shafts of the engine. Alternatively, the MIB system may include holes or ports formed in the static structure surrounding the impeller, such as an impeller shroud, through which bleed air is extracted and delivered to cooling circuits running radially outboard of the compressor and combustor sections. Impeller shrouds including such MIB ports are referred to herein as "MIB impeller shrouds."

By extracting bleed air from an impeller's mid section, a well-designed MIB system can boost the efficiency of the secondary flow system and improve overall gas turbine engine performance. Existing MIB systems and MIB impeller shroud designs remain limited in certain respects, however. Conventional MIB impeller shrouds may introduce undesired inefficiencies into the MIB system by, for example, permitting relatively high pressure losses as airflow is extracted from the rotating impeller through the static impeller shroud. Such pressure losses decrease the efficiency with which the velocity imparted to the compressed airflow by the rotating impeller is converted to static pressure within the MIB plenum. As a further drawback, conventional MIB impeller shrouds can be undesirably bulky, heavy, and costly to produce. Moreover, conventional MIB impeller shrouds and the manner in which such shrouds are secured within the engine compressor section may require the provision of relatively large running clearances between the impeller blade tips and interior surface of the shroud to ensure that physical contact does not occur between these components. Such large running clearances further negatively affect the compressor section efficiency and detract from overall gas turbine engine performance.

It is thus desirable to provide a MIB impeller shroud or a structure including a MIB impeller shroud (referred to herein as an "impeller shroud support"), which overcomes one or more of the aforementioned limitations. Ideally, embodiments of an impeller shroud support would enable airflow to be extracted from an impeller in a highly efficient manner that minimizes pressure losses, while further allowing a reduction in running clearances between the shroud and the impeller blade tips. It would also be desirable for such an impeller shroud support to be relatively lightweight, structurally robust, and readily manufacturable. Finally, it would be desirable to provide embodiments of a gas turbine engine or other turbomachine including impeller shroud supports having such characteristics. Other desirable features and characteristics of the present invention will become apparent from the subsequent Detailed Description and the appended Claims, taken in conjunction with the accompanying Drawings and the foregoing Background.

BRIEF SUMMARY

Embodiments of an impeller shroud support having Mid-Impeller Bleed (MIB) flow passages are provided. In one embodiment, the impeller shroud support includes a shroud body, a support arm joined to and extending around the shroud body, and a plurality of MIB flow passages. Each MIB flow passage includes an inlet formed in the shroud body and configured to receive bleed air extracted from an impeller, an outlet fluidly coupled to the inlet and through which the bleed air is discharged, and a curved intermediate section between the inlet and the outlet. During operation of a gas turbine engine or other turbomachine containing the impeller shroud support, the curved intermediate section turns the bleed air flowing through the MIB passage in a radially outward direction before discharging the airflow through the outlet and into a plenum surrounding the shroud.

In another embodiment, the impeller shroud support includes a shroud body and a support arm. The shroud body has an upstream portion, a downstream portion, and an intermediate portion between the upstream and downstream portions. The support arm includes a first arm section joined to the downstream portion of the shroud body and extending therefrom in primarily or essentially a forward direction. A second arm section is joined to the first arm section at an angle and extends therefrom in aftward and radially outward directions. The impeller shroud support further includes a plurality of MIB flow passages each having an inlet formed in the shroud body and an outlet formed in or adjacent to the first arm section.

Embodiments of a gas turbine engine including an impeller shroud support are further provided. In one embodiment, the gas turbine engine contains an impeller and an impeller shroud support. The impeller shroud support includes a shroud body disposed around the shroud body, a support arm joined to and extending around the shroud body, and a plurality of MIB flow passages formed in the impeller shroud support. Each MIB flow passage has an inlet through which bleed air is extracted from the impeller, an outlet through which the bleed air is discharged, and an intermediate section having a curved geometry turning bleed air flowing from the inlet to the outlet in a radially outboard direction prior to discharge from the MIB flow passage.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
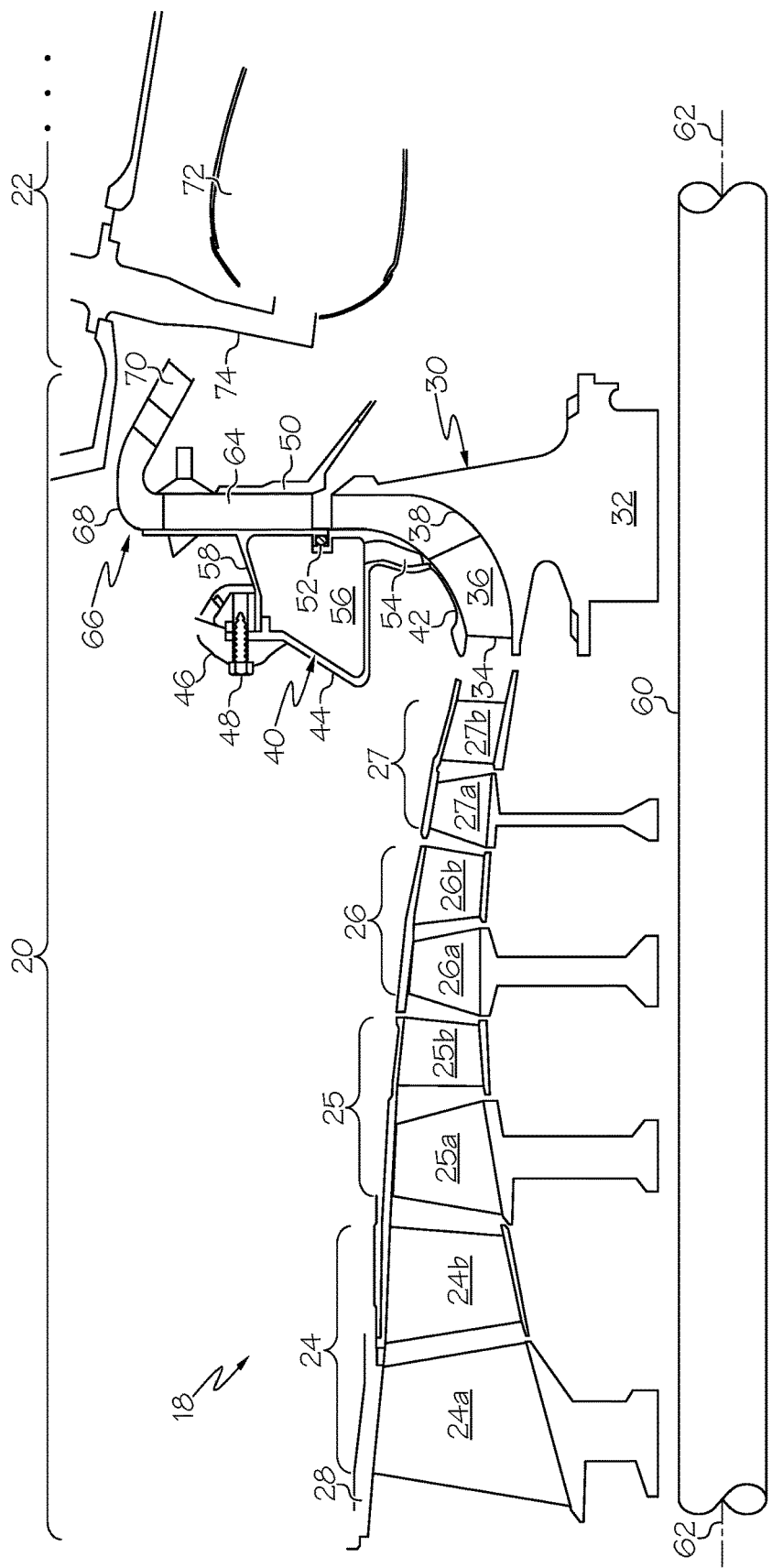
FIG. 1 is a schematic illustrating an exemplary gas turbine engine (partially shown) including a combustor section and a compressor section, which contains an impeller shroud support having multiple Mid-Impeller Bleed (MIB) flow passages therein, as illustrated in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description.

The term "exemplary," as appearing throughout this document, is synonymous with the term "example" and is utilized repeatedly below to emphasize that the following description merely provides multiple non-limiting examples of the invention and should not be construed to restrict the scope of the invention, as set-out in the Claims, in any respect. As further appearing herein, the term "radial" and the term "radially" refer to a direction or dimension taken along an axis perpendicular to the centerline of an impeller shroud support and/or to the centerline (or rotational axis) of a Gas Turbine Engine (GTE) containing an impeller shroud support. Similarly, the term "radial plane" refers to a plane orthogonal to the centerline of an impeller shroud support and/or a shroud-containing GTE. Conversely, the terms "axial" and "axially" refer to a direction or dimension taken along an axis parallel to the centerline of an impeller shroud support and/or the centerline of a shroud-containing GTE.

The following describes embodiments of an impeller shroud support including a shroud body, a support arm joined to the shroud body, and a number of optimally-shaped Mid-Impeller Bleed (MIB) ports or flow passages formed through the shroud body. When installed within a GTE or other turbomachine, the shroud body surrounds an impeller, while the support arm is bolted or otherwise attached to the GTE infrastructure. The MIB flow passages each include an inlet formed in the shroud body, an outlet formed in or adjacent the support arm, and an intermediate section connecting the inlet and outlet. The inlets of the MIB flow passages are advantageously formed to be flush with an interior surface of the shroud body and oriented to generally align with a tangential velocity component of airflow over the impeller at the point of extraction. The outlets of the MIB flow passages may further be oriented to discharge the bleed air in essentially radial directions, while the intermediate flow passage sections are imparted with non-linear, curved geometries to turn the bleed air in a radially outward as the airflow progresses through the MIB flow passages. Additionally, in certain implementations, the MIB flow passages may have cross-sectional flow areas that gradually increase or otherwise vary when transitioning from the flow passage inlet to the flow passage outlet. By virtue of this MIB flow passage design, the impeller shroud support may simultaneously provide both diffusion and deswirling functionalities, while minimizing pressure losses when extracting bleed air from a rotating impeller. The efficiency of the secondary flow system and overall performance of the GTE are improved as a result.

Embodiments of the impeller shroud support can include other unique and useful structural features in addition to or in lieu of those described above. For example, in certain embodiments, the support arm of the impeller shroud support can include a generally cylindrical arm section joined to the shroud body at a cylindrical-body interface. The generally cylindrical section may extend from the cylindrical-body interface in essentially a forward direction to meet a conical arm section and form an angle therewith. The MIB flow passage outlets may be located adjacent the arm-body interface and, perhaps, formed in an outer circumferential surface of the generally cylindrical section. During operation of the engine, the bleed air extracted from impeller is conducted through the generally cylindrical section and discharged adjacent the arm-body interface to provide cooling to the support arm. This may, in turn, reduce relative displacement between mating components that may otherwise occur due to disparities in thermal growth in at least some embodiments. Additionally, such a structural configuration, coupled with the angled design of the support arm, may permit installation of the impeller shroud support around an impeller in a manner reducing the running clearances between the impeller blade tips and the shroud interior to further improve GTE efficiency. In still further embodiments, the impeller shroud support can be produced such that the MIB flow passages are enclosed by raised tubular walls, which are interspersed with recessed valleys or crevices defined by the tubular walls and an outer surface of the shroud body. In such embodiments, the material volume of the impeller shroud support may be reduced to lower manufacturing costs, ease shroud manufacture, and minimize shroud weight, while preserving the overall structural integrity of the shroud.

While advantageous, many of the features described above are non-essential and need not be included in all embodiments of the impeller shroud support. Accordingly, alternative embodiments of the impeller shroud support may include only a subset of the aforementioned features in addition to other desirable features of the type described below. One or more exemplary embodiments of the impeller shroud support will now be described in conjunction with FIGS. 1-6. To provide an illustrative, albeit non-limiting context in which the impeller shroud support may be better understood, embodiments of the impeller shroud support are described below primarily in the context of an exemplary gas turbine engine, namely, the GTE schematically shown in FIG. 1. The following notwithstanding, it is emphasized that the impeller shroud support can be usefully employed in other types of gas turbine engines and, more generally, other impeller-containing turbomachines, such as turbochargers.

FIG. 1 is a generalized schematic of a portion of a GTE 18, as illustrated in accordance with an exemplary embodiment of the present invention. The illustrated portion of GTE 18 includes a compressor section 20 and a combustor section 22 (partially shown), which is positioned downstream of compressor section 20. The non-illustrated portions of GTE 18 further include an intake section upstream of compressor section 20, a turbine section downstream of combustor section 22, and an exhaust section downstream of the turbine section. As illustrated in FIG. 1, GTE 18 is provided by way of non-limiting example only; it will be understood embodiments of GTE 18 and other gas turbine engines containing ported shroud supports of the type described herein can vary widely in structure, function, and application. Furthermore, while GTE 18 will often be deployed on an aircraft as a propulsive engine, an Auxiliary Power Unit (APU), or a turboshaft engine, GTE 18 is not limited to such applications and can be deployed onboard other vehicles (e.g., watercraft and land vehicles) or utilized in non-vehicle applications, such as industrial power generation applications.

Compressor section 20 includes a number of axial compressor stages, which are disposed in flow series. In the illustrated exemplary embodiment, specifically, compressor section 20 includes four axial compressor stages 24-27. Each axial compressor stage 24-27 includes a rotor "(a)" followed by a stator "(b)." For example, the first axial compressor stage 24 contains a first rotor 24(a) and a first stator 24(b), the second axial compressor stage 25 contains a second rotor 25(a) and a second stator 25(b), and so on. Axial compressor rotors 24(a)-27(a) are each essentially bladed wheels, which are mounted to a common shaft 60 and which rotate along therewith about rotational axis 62 during operation of GTE 18. By comparison, stators 24(b)-27(b) are essentially bladed rings, which are affixed to the static engine infrastructure and do not rotate during engine operation. An engine casing 28, which has a generally tubular shape and which may be made-up of one or more individual pieces or shrouds, surrounds or circumscribes axial compressor stages 24-27. The final axial compressor stage 27 feeds into a radial compressor stage 28 containing a centrifugal compressor or impeller 30 (shown in a flattened cross-sectional or "meridional" view).

Impeller 30 includes a disk hub 32 from which a plurality of blades 34 extends and wrap tangentially around disk 32 in a twisting or spiral pattern. While only a limited portion of impeller 30 is shown in FIG. 1, the disk hub 32 is generally axisymmetric around the rotational axis of GTE 18 and the centerline of impeller 30. The disk hub 32 of impeller 30 has an outer surface or "hub" 38. A number of impeller flow paths 36 extend from the inlet of impeller 30 to the outlet thereof. Impeller flow paths 36 are generally defined or bound by hub 38 and blades 34. The region of impeller 30 along which an initial portion of each flow path 36 extends, as measured along hub 38, is referred herein to as the "inducer portion" of impeller 30. The region of impeller 30 along which an intermediate portion of each flow path 36 extends is referred to as the "knee portion." Finally, the portion of impeller 30 along which the final portion each flow paths 36 extends is referred to as the "exducer portion" of impeller 30.

An impeller shroud support 40 is further mounted within GTE 18 and adjacent to impeller 30. As appearing herein, the term "impeller shroud support" refers to a structure or assembly including an impeller shroud and at least one support or mounting feature, such as support arm 44 (described below). Impeller shroud support 40 includes a shroud body 42, the inside conical surface of which forms the outer surface of the impeller flow path. Shroud body 42 is substantially axisymmetric about the centerline of shroud support 40 (identified by double-headed arrow 62 in FIGS. 2-3, as described below) and generally bound by two surfaces of revolution. In further embodiments, shroud body 42 can have other geometries providing that body 42 and, more generally, impeller shroud support 40 can be positioned around an impeller (e.g., impeller 30 shown in FIG. 1) in a non-contacting, but closely conforming relationship, as described below.

Attached to shroud body 42 is a generally cylindrical support arm 44; the term "generally cylindrical" utilized in a broad sense considering that the three dimensional geometry of support arm 44 will typically be more complex than that of a simple tube or ring, as will become apparent from the description below. When impeller shroud support 40 is installed within GTE 18, shroud body 42 surrounds impeller 30 in a non-contacting, but closely conforming relationship with the outer diameter of the impeller blades 34. Impeller shroud support 40 is suspended around impeller 30 by support arm 44, which is joined to static engine infrastructure 46 (partially shown) included within GTE 18 utilizing, for example, plurality of bolts 48 or other fasteners (one of which can be seen in FIG. 1). The aft end of shroud body 42 also matingly engages or abuts at least one diffuser structure 50 in a non-stepped or flush relationship, as taken along the airflow path. If desired, an annular compression seal 52 may be compressed between the aft end of shroud body 42 and the inner radial end of diffuser structure 50 to better seal this interface.

With continued reference to the exemplary embodiment shown in FIG. 1, impeller shroud support 40 further includes a number of MIB flow passages 54 through which bleed air is extracted from a mid section of impeller 30 during operation of GTE 18. Specifically, and by way of example only, MIB flow passages 54 may draw bleed air from the knee region of impeller flow paths 36 and then direct the bleed air into a plenum 56 defined by shroud support 40 and diffuser structure 50. The bleed air may then flow through a number of openings 58 and into a larger secondary flow circuit (not shown) for a desired usage, such as cooling a portion of the high pressure turbine included in the non-illustrated turbine section of GTE 18. Impeller shroud support 40 and MIB flow passages 54 are described more fully below in conjunction with FIGS. 2-5. First, however, additional description of GTE 18 is provided.

Impeller 30 is mounted to shaft 60 utilizing a rotationally-fixed coupling (e.g., a curvic-type coupling or a friction coupling) such that impeller 30 and shaft 60 rotate in unison about rotational axis 62 of GTE 18 (also representative of the centerline of impeller shroud support 40). As previously noted, axial compressor rotors 24(a)-27(a) may also be mounted to shaft 60 or to a different shaft included in GTE 18 (not shown), depending upon the design of the engine. In alternative embodiments, compressor section 20 may include additional or fewer axial compressor stages and/or an intake fan positioned upstream of compressor stages 24-27, which may be mounted to shaft 60 or another shaft coaxial therewith. In other embodiments, GTE 18 may lack axial compressor stages and rely solely on one or more impellers such as impeller 30 for compression purposes. During operation of GTE 18, impeller shroud support 40 guide the engine airflow from the inlet or inducer end of impeller 30 to the outlet or exducer end thereof in the passage formed by the shroud body 42 surface and the hub 38 surface.

The pressurized airflow discharged from impeller 30 is received by one or more diffuser flow passages 64 contained within diffuser structure 50. Diffuser structure 50 is included within a larger diffusion system 66, which is positioned radially outboard of impeller 30 and impeller shroud support 40. Diffusion system 66 also includes a bend 68 and a deswirl portion 70, which guides airflow received from impeller 30 into combustor section 22 and, specifically, into at least one combustor 72 contained therein (partially shown in FIG. 1). A number of fuel injectors 74 (one shown) project into combustor 72 and, during operation of GTE 18, inject fuel into combustor 72 for mixture with the compressed air supplied by compressor section 20. The fuel-air mixture is then ignited, and the resulting combustive gasses heat rapidly, expand, and flow from combustor section 22 into a non-illustrated turbine section. Within the turbine section, the combustive gasses flow through a number of turbines to drive the rotation thereof. Rotation of the turbines drives rotation of shaft 60, impeller 30, and axial compressor rotors 24(*a*)-27(*a*). Finally, the combustive gasses are expelled from the non-illustrated turbine section and, in certain cases, directed through a nozzle to generate forward thrust. The power output of GTE 18 may be utilized in a variety of different manners depending upon whether GTE 18 assumes the form of a turbofan, turboprop, turboshaft, turbojet, or another type of engine.

Figure 2:
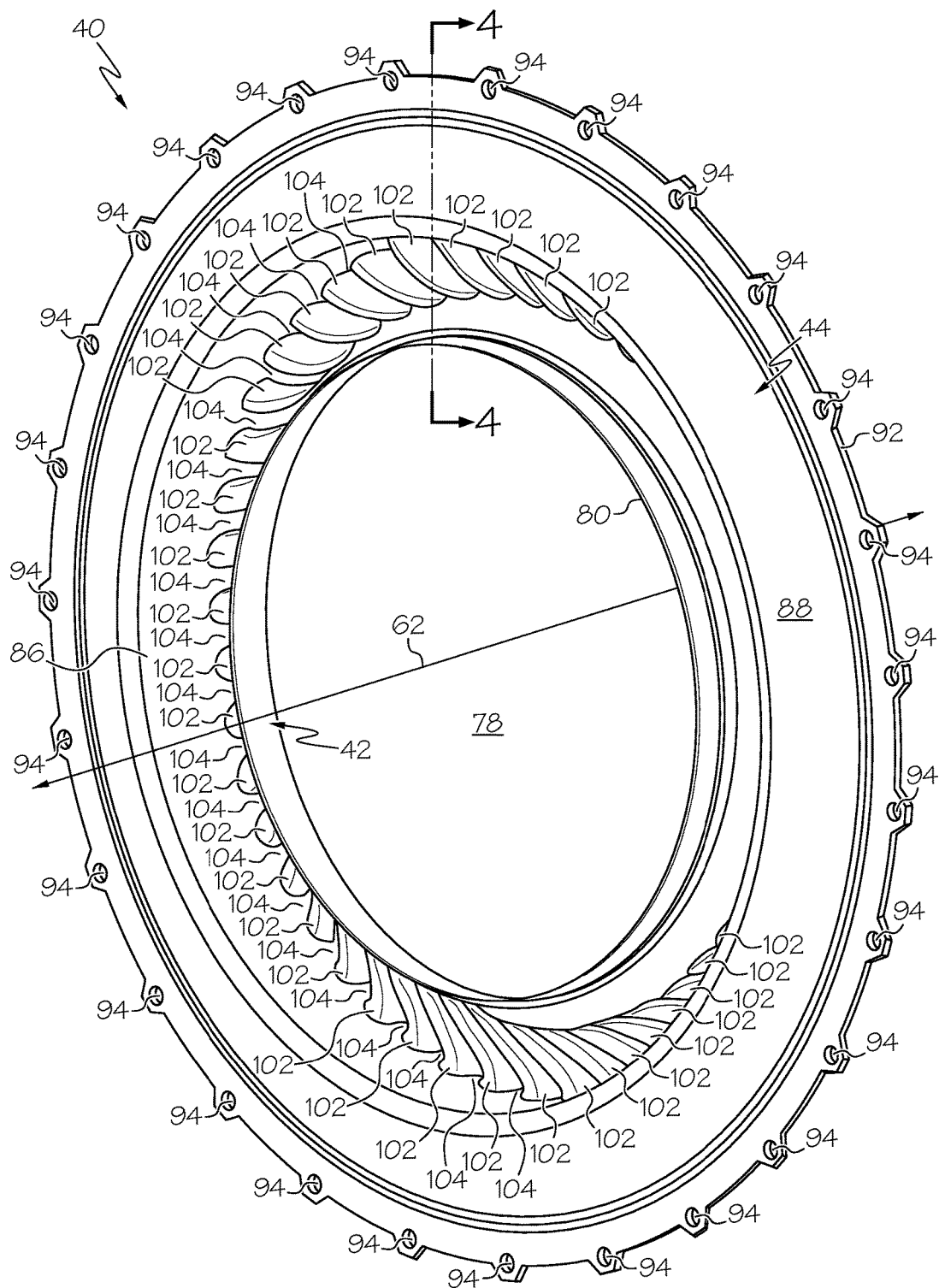
FIGS. 2 and 3 are side views of the exemplary impeller shroud support shown in FIG. 1 rotated slightly about a vertical axis in opposing directions to better illustrate the frontside and backside of the shroud support, respectively.
Figure 3:
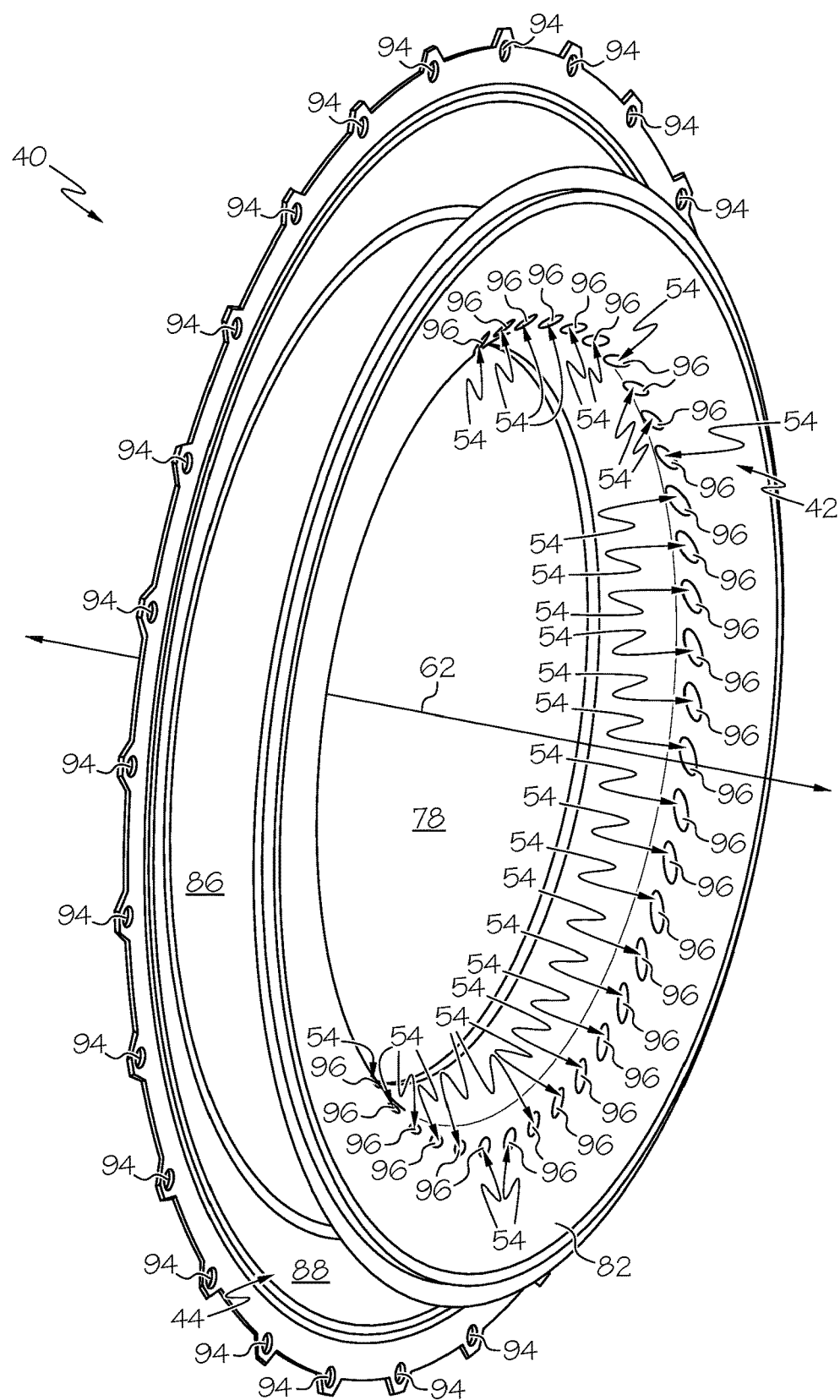
Figure 4:
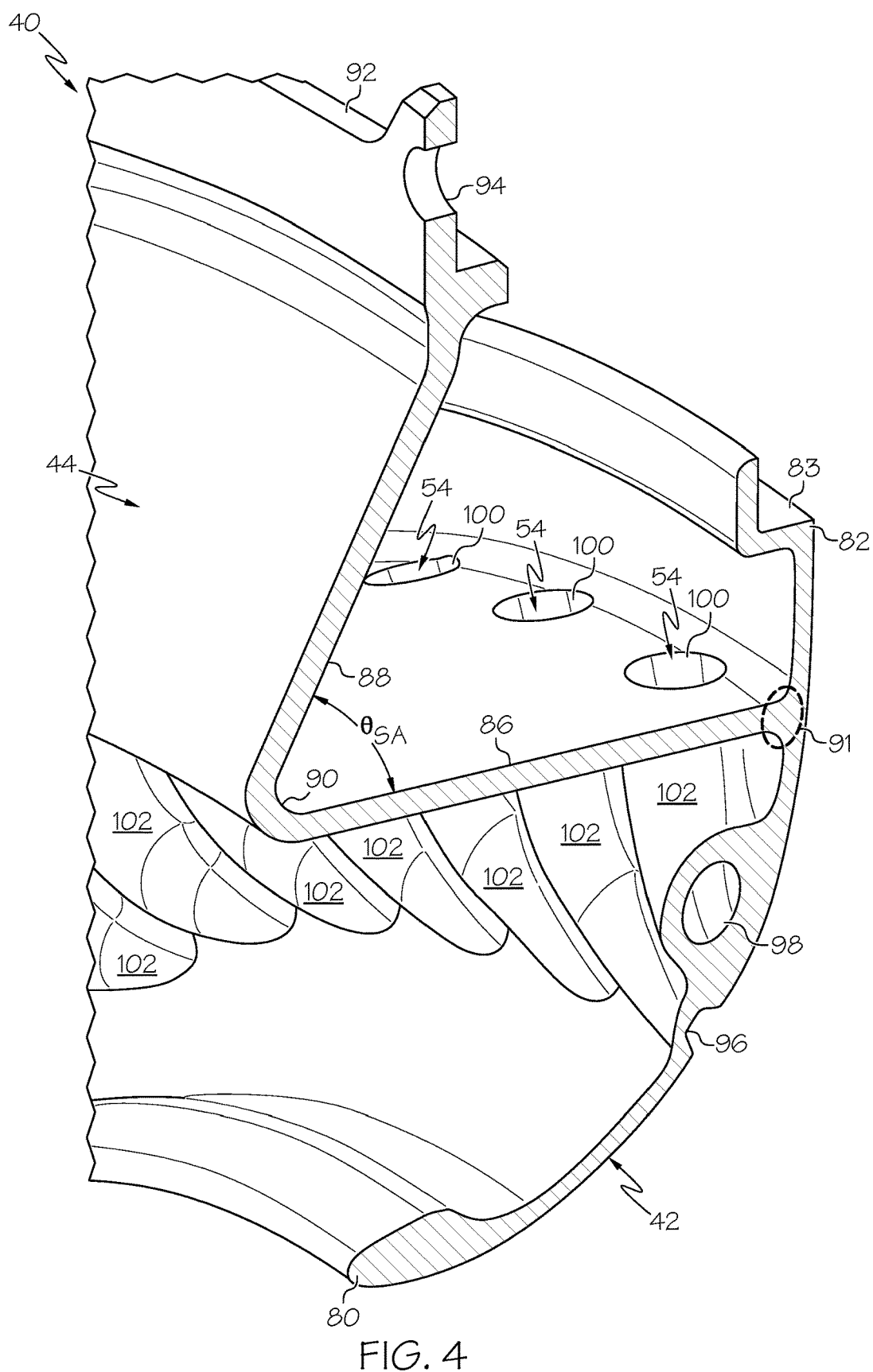
FIG. 4 is a cross-sectional view of a portion of the exemplary impeller shroud support shown in FIGS. 2-3, as taken along section plane 4-4 identified in FIG. 2, further illustrating the curved geometry of the MIB flow passages.

FIGS. 2 and 3 are side views of impeller shroud support 40, as rotated slightly about a vertical axis to better illustrate the non-flow path and flow path sides thereof, respectively. Impeller shroud support 40 is further illustrated in cross-section in FIG. 4, as taken along section plane 4-4 identified in FIG. 2. Shroud body 42 includes a central opening 78, a leading edge or upstream portion 80 at the inlet of the impeller flow path, and an opposing trailing edge or downstream portion 82 at the impeller flow path exit. Central opening 78 increases in inner diameter when moving aftward along centerline 62 in a manner generally following the outer contour of impeller blades 34 (FIG. 1). As indicated in FIGS. 2-4, leading edge portion 80 of shroud body 42 may be imparted with a locally thickened geometry forming a gentle inlet bellmouth, which helps consolidate airflow entering the inlet of impeller 30. Trailing edge portion 82 of shroud body 42 can include an annular recess or shelf 83 (identified in FIG. 4), which matingly engages diffuser structure 50 and supports compression seal 52 in the previously-described manner.

Support arm 44 is joined to shroud body 42 at a cylindrical-body interface 91 (as identified in FIG. 4). The outside diameter of support arm 44 is joined to a radial flange 92 circumscribing conical shroud support 40. Circumferentially-spaced fastener openings 94 are formed in radial flange 92 and receive bolts 48 (FIG. 1) or other such fasteners to secure impeller shroud support 40 in a desired position when impeller shroud support 40 is installed within GTE 18. In the illustrated example, impeller shroud support 40 is produced as a single or monolithic piece such that shroud body 42 and support arm 44 are integrally joined at arm-body interface 91. In further embodiments, support arm 44 and shroud body 42 can be separately produced and joined at arm-body interface 91 utilizing fasteners, utilizing a permanent joinder technique (e.g., welding or brazing), or in another manner. Suitable manufacturing processes for producing impeller shroud support 40 include, but are not limited to, casting and machining, Direct Metal Laser Sintering (DMLS), and other additive manufacturing techniques.

Impeller shroud support 40 is advantageously produced such that arm-body interface 91 is located closer to the downstream end or trailing edge portion 82 of shroud body 42 than to the upstream end or leading edge portion 80 of shroud body 42, although this need not be the case in all embodiments. Additionally, impeller shroud support 40 can be produced such that support arm 44 includes at least two arm sections, which may be integrally coupled or assembled to yield arm 44. Considering the illustrated example, specifically, support arm 44 includes two integrally-connected arm sections: a first arm section 86 and a second arm section 88. Arm section 86 has a substantially tubular or cylindrical geometry and is consequently referred to hereafter as "cylindrical arm section 86." By comparison, arm section 88 has a generally conical geometry and is referred to hereafter as "conical arm section 88."

With continued reference to FIGS. 2-4, and as shown most clearly in FIG. 4, cylindrical arm section 86 of support arm 44 extends from shroud body 42 (specifically, from arm-body interface 91) in an essentially or primarily forward direction. In the illustrated embodiment, and by way of non-limiting example only, cylindrical arm section 86 has a substantially constant thickness and extends substantially parallel to the centerline or longitudinal axis of impeller shroud support 40 (identified in FIG. 3 by double-headed arrow 62 and corresponding to centerline 62 of GTE 18 shown in FIG. 1). Cylindrical arm section 86 meets conical arm section 88 at a vertex or juncture 90 (identified in FIG. 4). From juncture 90, conical arm section 88 then extends in radially outward and aftward directions before terminating at radial flange 92. Support arm 44 may thus be described as having a generally L-shaped cross-sectional geometry in the illustrated embodiment, as taken along a section plane extending parallel to the centerline of impeller shroud support 40 and GTE 18. As labeled in FIG. 4, arm sections 86 and 88 cooperate to form an angle $\theta_{SA}$ at juncture 90. Angle $\theta_{SA}$ is acute in the illustrated embodiment. In further embodiments, angle $\theta_{SA}$ may be greater than 35 degrees (°) and less than or equal to 90°. In further embodiments, $\theta_{SA}$ may be greater than or less than the aforementioned angular range, while arm sections 86 and 88 may vary in shape, dimensions, and/or relative dispositions.

During operation of GTE 18 (FIG. 1), the airflow bled from impeller 30 is conducted through MIB flow passages 54 and injected into plenum 56. As described more fully below, the outlets of MIB flow passage outlets 54 can be formed in or adjacent an outer circumferential surface of cylindrical arm section 86 at, for example, a location axially adjacent arm-body interface 91. This allows the bleed air flowing through MIB flow passages 54 to provide cooling to the arm-body interface 91 and support arm 44 during operation of impeller shroud support 40 and GTE 18. Furthermore, the angled juncture formed by cylindrical arm section 86 and conical arm section 88 permits a certain degree of flexibility or compliance within support arm 44. In at least some embodiments, this may help accommodate disparities in thermal growth due to the relatively significant thermal gradient that may develop between the flange mounting interface and arm-body interface 91 during engine operation. Such an angled juncture may also help minimize the pressure deflections and required operating clearances associated with impeller shroud support 40. The combination of MIB flow passages 54 and support arm 44 may thus enable installation of impeller shroud support 40 around impeller 30 in closely spaced, non-contacting relationship reducing the running the impeller bade tips and interior surface of shroud body 42. The efficiency of compressor section 20 and overall GTE performance may be further improved as a result.

The shape, dimensions, and relative dispositions of MIB flow passages 54 within impeller shroud support 40 will vary amongst embodiments. However, in general, impeller shroud support 40 allows the respective geometries of MIB flow passages 54 to be tailored in three dimensions in a manner providing highly efficient (low pressure loss) extraction of bleed air from the impeller, while also providing optimized diffusion rates and/or deswirling of the bleed air prior to injection into plenum 56. This may be more fully appreciated by referring to FIG. 5, which is a cross-sectional view of impeller shroud support 40 (partially shown), as taken along a section plane orthogonal to shroud centerline 62 (FIGS. 1 and 3). As identified in this figure, each MIB flow passage 54 includes an inlet 96, an outlet 100, and an intermediate section 98 fluidly coupling inlet 96 and outlet 100. Additionally, MIB Flow passages 54 can be produced to further include enlarged lead-in portions or "throat" portions 97 (identified in FIG. 6), which help provide controlled transitions between inlets 96 and intermediate flow passage sections 98. When present, throat portions 97 can be shaped and dimensioned in a manner enhancing control of the flow area of MIB flow passages 54. Due to the positioning of throat portions 97, a line-of-sight is provided from the interior of shroud support 40, through the MIB flow passage inlets 96, and to throat portions 97. Consequently, the dimensions of throat portions 97 can be refined through machining or "finished-sized" after initial fabrication (e.g., casting) of impeller shroud support 40. A reaming operation or other machining technique may be utilized for this purpose. This enables part-to-part flow variations to be minimized, while further allowing the flow rate through MIB flow passages 54 to be carefully controlled and consistently maintained across iterations of the manufacturing process.

Figure 5:
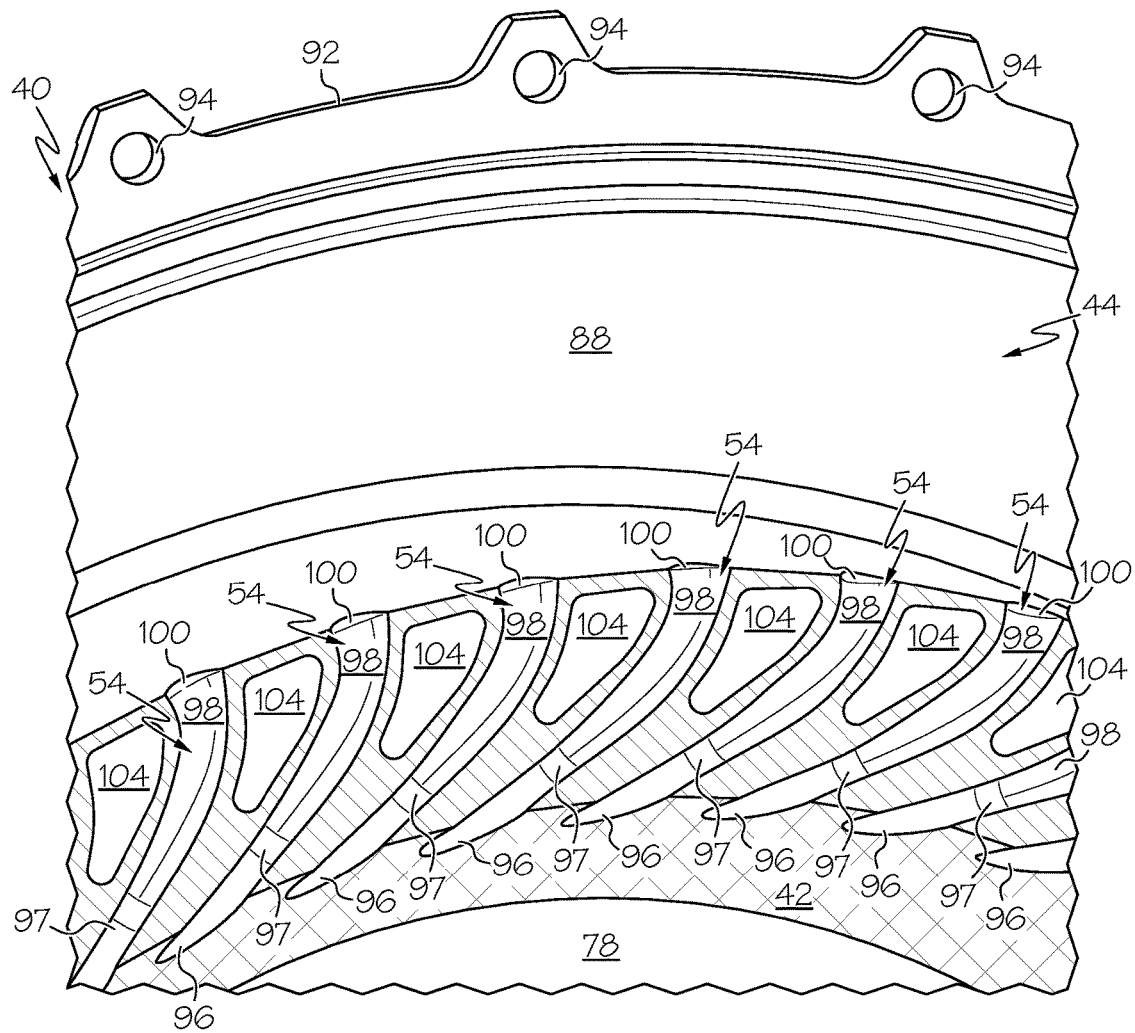
FIG. 5 is a cross-sectional view of a portion of the exemplary impeller shroud support shown in FIGS. 2-4, as taken along a section plane orthogonal to the centerline of the shroud.

MIB flow passage inlets 96 can be formed in an interior surface of shroud body 42 at a location upstream of cylindrical-body interface 91. Additionally, MIB flow passage inlets 96 are advantageously formed to be flush with an interior shroud surface of shroud body 42. Finally, MIB flow passage inlets 96 oriented to generally align with a tangential velocity component of airflow over and along impeller flow paths 36 (FIG. 1) at the point of extraction, as generally shown in FIGS. 4 and 5. Such features promote more efficient flow into MIB flow passages 54 minimizing pressure losses when extracting bleed air from impeller 30. If desired, the edge of the MIB flow passage inlets 96 can be radiused to reduce the inlet losses. By comparison, MIB flow passage outlets 100 can be formed in the outer circumferential surface of cylindrical arm section 86, as generally shown in FIGS. 2-5. Alternatively, impeller shroud support 40 can be produced to further include tube-like extensions, which project radially outward from cylindrical arm section 86 and which extend MIB flow passages 54 by relatively short distances. In such embodiments, the elongated MIB flow passages 54 may extend through cylindrical arm section 86, while MIB flow passage outlets 100 may be located adjacent, but radially outboard of arm section 86. MIB flow passage outlets 100 are formed around an outer circumferential surface of cylindrical arm section 86, preferably at locations axially adjacent arm-body interface 91.

Intermediate flow passage sections 98 are each formed to follow a non-linear or curved path, which gradually bends or bows in a radially outward direction when transition from inlet 96 to outlet 100. Stated differently, MIB flow passages 54 are each produced to have a curved geometry, as projected onto a radial plane orthogonal to shroud centerline 62. Additionally, MIB flow passages 54 may be formed to extend essentially in radial directions such that inlets 96 and outlets 100 may be transected by a common radial plane orthogonal to a centerline 62. During operation of GTE 18 (FIG. 1), curved intermediate flow passage sections 98 turn the bleed air flowing through passages 54 in a radially outboard direction prior to discharge through MIB flow passage outlets 100 and into surrounding plenum 56. This permits the tangential velocity component of the airflow bled from impeller 30 to be more effectively converted to static pressure when injected into MIB plenum 56 to further improve the efficiency of the secondary flow system and overall GTE performance. Additionally, as can be seen most clearly in FIG. 5, the cross-sectional flow area of each flow passage 54 may gradually increase when progressing from inlet 96 to outlet 100. Impeller shroud support 40 may consequently provide a diffusion function in additional to the above-described deswirling when delivering bleed air from impeller 30 to plenum 56.

In the exemplary embodiment of FIGS. 2-5, impeller shroud support 40 is produced to include an angularly-spaced array of raised tubular walls 102, which each enclose an MIB flow passage 54. Tubular walls 102 are raised relative to the forward face of shroud body 42 (as viewed along impeller centerline 62 in an aft direction) and are circumferentially interspersed with a number of recesses or valleys 104. As can be seen most clearly in FIGS. 2 and 4, tubular walls 102 extend along an outer, forward-facing surface of shroud body 42 to an inner radial surface of cylindrical arm section 86. Valleys 104 are essentially voids, which are defined by raised tubular walls 102 and an outer surface of shroud body 42. This provides a number of advantages. First, such a structural design may help decouple the MIB flow passage geometry from the structural constraints of impeller shroud support 40 to allow the flow passage geometry to be designed in a manner turning the bleed flow in a radial direction, achieving an optimal diffusion rate, or otherwise tailoring the aerodynamic performance of impeller shroud support 40 to best suit a particular application. As a result, such a design enables shroud support 40 to be cast or otherwise produced utilizing a reduced volume of material. Shroud production costs and weight may consequently be minimized, while facilitating shroud manufacturing processes; e.g., the provision of raised tubular walls 102 and valleys 104 may help promote reliable, void-free casting of shroud support 40 in certain embodiments.

Figure 6:
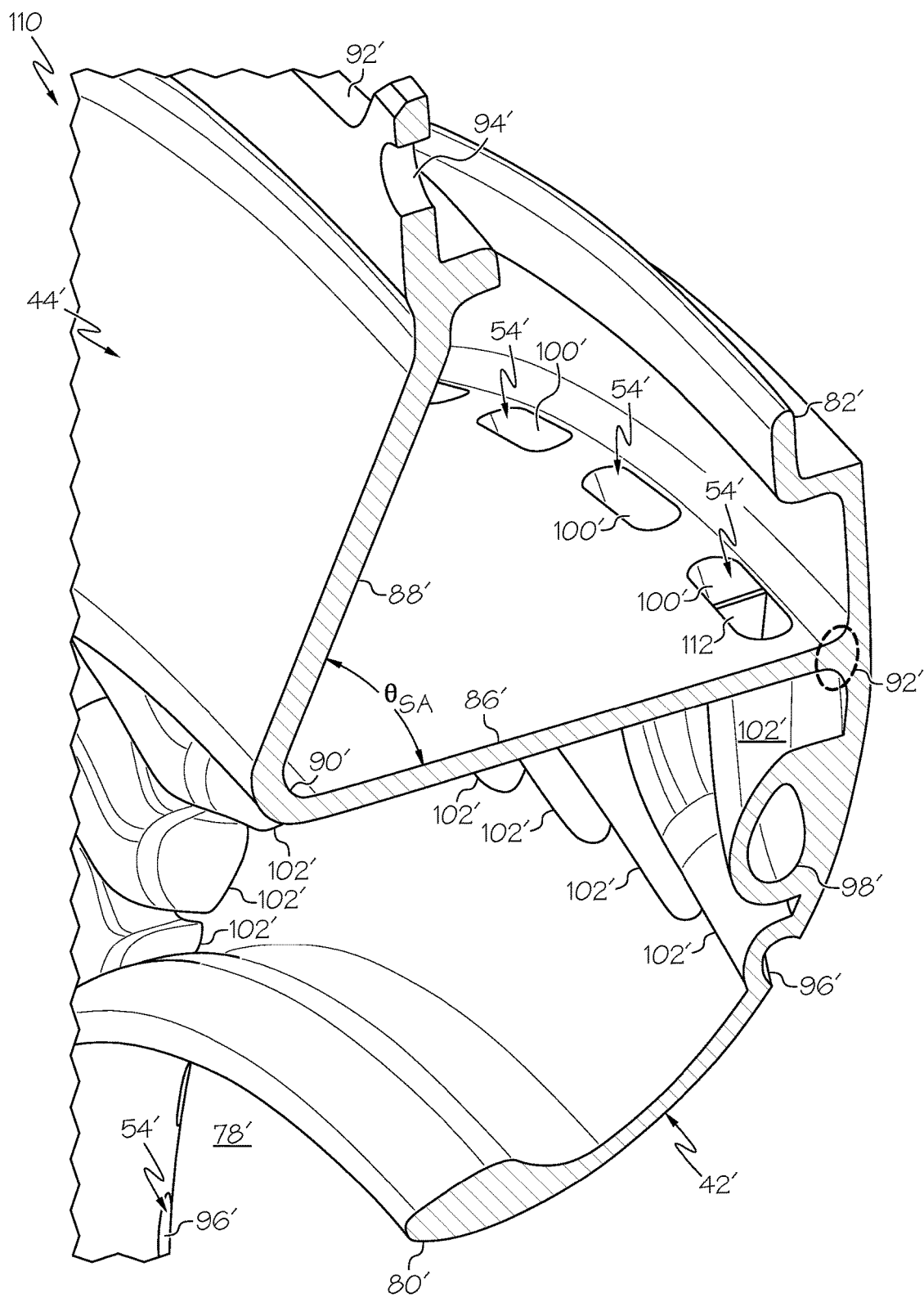
FIG. 6 is a cross-sectional view of a portion of an impeller shroud support, which generally corresponds with the cross-section shown in FIG. 4 and which is illustrated in accordance with a further exemplary embodiment of the present invention.

The foregoing has thus provided an embodiment of a ported shroud support having a plurality of MIB flow passages therein. As generally described above, the ported shroud support enables MIB flow passages geometry to be tailored to achieve an optimal diffusion rate, while simultaneously turning bleed airflow in a radial direction to convert the tangential velocity component of the airflow extracted from the impeller to static pressure within the MIB plenum in a highly efficient manner. As further described above, the inlets the MIB flow passages are also usefully shaped and oriented to promote relatively controlled, low loss airflow into the inlets of the MIB flow passages. In further embodiments, the planform geometry of the MIB flow passage inlet and outlets can be varied, as desired, to better suit a particular application or set of design goals. To further emphasize this point, FIG. 6 provides cross-sectional view of a portion of an impeller shroud support 110, which generally corresponds with the cross-section shown in FIG. 4 and which is illustrated in accordance with a further exemplary embodiment of the present invention. Impeller shroud support 110 is similar to impeller shroud support 40 shown in FIGS. 2-5; thus, like reference numerals are utilized to denote like features of impeller shroud support 110, but with the addition of a single prime symbol (') to indicate that such features may differ to varying extents.

With reference to FIG. 6, outlets 100' have been imparted with elongated, non-circular (e.g., ovular or rounded rectangular) planform geometries. Additionally, outlets 100' are oriented such that a major axis of each outlet 100' extends tangentially to the centerline of impeller shroud support 110. In this manner, the material between each neighboring pair of outlet 100' may effectively serve as a vane to enhance the deswirling function provided by shroud support 110 when injecting airflow into the surrounding plenum. If desired, vanes 112 (only one of which is shown in FIG. 6) can be inserted into, formed in, or otherwise provided in MIB flow passages 54' to further enhance deswirling. Deswirl vanes similar or identical to vanes 112 can also be included in impeller shroud support 40 shown in FIGS. 2-5 in further embodiments. Moreover, further embodiments of the impeller shroud support can include a first group of MIB flow passage outlets having a first geometry (e.g., a circular planform geometry similar to that shown in FIGS. 2-5) in addition to a second group of MIB flow passage outlets having a second geometry (e.g., an elongated planform geometry, such as that shown in FIG. 6). Thus, such features are not mutually exclusive in the context of the present disclosure.

There has thus been provided multiple embodiments of a ported shroud support having a plurality of MIB flow passages therein. In certain embodiments, the MIB flow passages may be formed to include non-linear or curved mid-sections shaped to turn bleed air extracted from an impeller in a radially outboard direction prior to discharge into a plenum surrounding the impeller shroud support. The MIB flow passages may also vary (e.g., gradually increase) in cross-sectional flow area when transitioning from the inlets to the outlets thereof. In this manner, the MIB flow passages can provide both diffusion and deswirling functionalities, while minimizing pressure losses when extracting airflow from the impeller. The efficiency the secondary flow system and overall GTE performance is improved as a result. Embodiments of the above-described impeller shroud support may also provide a support arm design that permitting may permit installation of the impeller shroud support around an impeller in a manner reducing the required impeller tip clearances to boost the overall efficiency of the engine's compressor section. In certain embodiments, enlarged throat regions may be provided between the inlets and the outlets of the MIB flow passages. In such embodiment, the throat portions may each have dimensions enlarged by removal of material from (e.g., reaming of) the impeller shroud support, as may be evident from examination of the shroud support and, specifically, from the final dimensions and surface finish of throat portions. Finally, in at least some embodiments, the impeller shroud support can be produced such that the MIB flow passages are enclosed by raised tubular walls interspersed with recessed valleys or crevices. This allows a reduction in the material volume of the impeller shroud support to achieve weight savings, lower production costs, and facilitate shroud manufacture.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. An impeller shroud support for disposition around an impeller, the impeller shroud support comprising:
    a shroud body;
    a support arm joined to and extending around the shroud body, the support arm comprising:
        a cylindrical arm section; and
        a conical arm section joined to the generally cylindrical arm section opposite the shroud body, the conical arm section extending from the generally cylindrical arm section in radially outward and aftward directions; and
    a plurality of Mid-Impeller Bleed (MIB) flow passages, each comprising:
        an inlet formed in the shroud body and configured to receive bleed air extracted from the impeller;
        an outlet fluidly coupled to the inlet and through which the bleed air is discharged; and
        an intermediate section between the inlet and the outlet, the intermediate section having a curved geometry turning bleed air flowing from the inlet to the outlet in a radially outboard direction prior to discharge from the MIB flow passage; and
    raised tubular walls enclosing the plurality of MIB flow passages and projecting from the shroud body.

2. An impeller shroud support for disposition around an impeller, the impeller shroud support comprising:
    a shroud body;
    a support arm joined to and extending around the shroud body;
    a plurality of Mid-Impeller Bleed (MIB) flow passages, each comprising:
        an inlet formed in the shroud body and configured to receive bleed air extracted from the impeller;
        an outlet fluidly coupled to the inlet and through which the bleed air is discharged; and
        an intermediate section between the inlet and the outlet, the intermediate section having a curved geometry turning bleed air flowing from the inlet to the outlet in a radially outboard direction prior to discharge from the MIB flow passage; and
    raised tubular walls enclosing the plurality of MIB flow passages and projecting from the shroud body.

3. The impeller shroud support of claim 2 wherein the outlets of the plurality of MIB flow passages are formed in or adjacent the support arm.

4. The impeller shroud support of claim 2 wherein the support arm comprises a generally cylindrical arm section joined to the shroud body at an arm-body interface.

5. The impeller shroud support of claim 4 wherein the outlets of the plurality of MIB flow passages are formed in the generally cylindrical arm section at a location axially adjacent the arm-body interface.

6. The impeller shroud support of claim 4 wherein the shroud body has an upstream end and a downstream end, and wherein the arm-body interface is located closer to the downstream end of the shroud body than to the upstream end thereof.

7. The impeller shroud support of claim 4 wherein the inlets of the plurality of MIB flow passages are formed in an inner surface of the shroud body at one or more locations upstream of the arm-body interface.

8. The impeller shroud support of claim 4 wherein the generally cylindrical arm section extends from the arm-body interface in an essentially forward direction.

9. The impeller shroud support of claim 2 wherein the inlets of the plurality of MIB flow passages are substantially flush with an inner circumferential surface of the shroud body.

10. The impeller shroud support of claim 2 wherein, for each of the plurality of MIB flow passages, the cross-sectional flow area of the MIB flow passages increases when progressing from the inlet to the outlet.

11. The impeller shroud support of claim 2 wherein the outlets of the plurality of MIB flow passages each have an elongated planform shape, and wherein a major axis of each of the outlets extends tangentially to a centerline of the impeller shroud support.

12. The impeller shroud support of claim 2 further comprising recessed valleys defined by and circumferentially interspersed with the raised tubular walls.

13. The impeller shroud support of claim 2 wherein the plurality of MIB flow passages each comprise a throat portion between the inlet and the outlet, the throat portion having dimensions enlarged by removal of material from the impeller shroud support.

14. An impeller shroud support, comprising:
a shroud body having an upstream portion, a downstream portion, and an intermediate portion between the upstream and downstream portions;
a support arm, comprising:
a first arm section joined to the downstream portion of the shroud body and extending therefrom in primarily a forward direction; and
a second arm section joined to the first arm section at an angle, the second arm section extending from the first arm section in aftward and radially outward directions; and
a plurality of Mid-Impeller Bleed (MIB) flow passages each having an inlet formed in the shroud body and an outlet formed in or adjacent the first arm section.

15. The impeller shroud support of claim 14 wherein the plurality of MIB flow passages each have a curved geometry, as projected onto a radial plane orthogonal to a centerline of the impeller shroud support.

16. The impeller shroud support of claim 14 wherein inlets and outlets of the plurality of MIB flow passages are transected by a common radial plane orthogonal to a centerline of the impeller shroud support.

17. The impeller shroud support of claim 14 wherein the first arm section and the second arm section form an angle $\theta_{SA}$ at a vertex thereof, and wherein $35° > \theta_{SA} < 90°$.

18. The impeller shroud support of claim 14 wherein the first arm section is joined to the shroud body at an arm-body interface, and wherein the first arm section comprises an outer circumferential surface in which the inlets of the plurality of MIB flow passages are formed.

19. The impeller shroud support of claim 14 wherein, for each of the plurality of MIB flow passages, the cross-sectional flow area of the MIB flow passages increases when progressing from the inlet to the outlet.

20. The impeller shroud support of claim 14 wherein the outlets of the plurality of MIB flow passages each have an elongated planform shape, and wherein a major axis of each of the outlets extends tangentially to a centerline of the impeller shroud support.

* * * * *